(12) United States Patent
Hu et al.

(10) Patent No.: US 8,929,748 B2
(45) Date of Patent: Jan. 6, 2015

(54) TUNABLE DENSE WAVELENGTH DIVISION MULTIPLEXING TRANSCEIVER, CIRCUITS AND DEVICES THEREFOR, AND METHODS FOR MAKING AND USING SUCH TRANSCEIVERS, CIRCUITS AND DEVICES

(75) Inventors: Zhaoyang Hu, Westlake Village, CA (US); Qing Xiao, Sichuan (CN); Meiling Lu, Sichuan (CN); Yan Chen, Sichuan (CN); Thomas Liljeberg, West Hills, CA (US)

(73) Assignee: Source Photonics, Chatsworth, CA (US)

( * ) Notice: Subject to any disclaimer, the term of this patent is extended or adjusted under 35 U.S.C. 154(b) by 372 days.

(21) Appl. No.: 13/050,787

(22) Filed: Mar. 17, 2011

(65) Prior Publication Data

US 2011/0229129 A1    Sep. 22, 2011

(51) Int. Cl.
| | | |
|---|---|---|
| *H04B 10/00* | (2013.01) | |
| *H04B 10/04* | (2006.01) | |
| *H04B 10/12* | (2006.01) | |
| *H04B 10/40* | (2013.01) | |
| *H04B 10/50* | (2013.01) | |

(52) U.S. Cl.
CPC .............. *H04B 10/40* (2013.01); *H04B 10/506* (2013.01)
USPC ............ 398/196; 398/135; 398/137; 398/195

(58) Field of Classification Search
CPC ........... H04B 10/0773; H04B 10/0775; H04B 10/0779; H04B 10/079; H04B 10/0793; H04B 10/0795; H04B 10/07957; H04B 10/057; H04B 17/0017; H04B 17/002; H04B 17/0022; H04B 17/0025; H04B 17/0027; H04B 17/003; H04B 17/0037; H04B 17/00; H04B 17/0002; H04B 17/0005; H04B 17/0015
See application file for complete search history.

(56) References Cited

U.S. PATENT DOCUMENTS

| | | | |
|---|---|---|---|
| 5,548,607 | A * | 8/1996 | Tsang .................... 372/50.11 |
| 7,183,540 | B2 | 2/2007 | Zhang et al. |
| 7,200,336 | B2 | 4/2007 | Yu et al. |
| 7,650,077 | B2 | 1/2010 | Yu et al. |
| 2004/0067060 | A1* | 4/2004 | Aronson et al. ............ 398/135 |
| 2004/0114646 | A1 | 6/2004 | Stewart et al. |

(Continued)

OTHER PUBLICATIONS

Zhaoyang Hu, Hucheng Li, Anbin Wang and Meiling Lu; "Method, Circuitry and Apparatus for Outputting a Stable Optical Signal in a Dense Wavelength Division Multiplexing Device During Fast Changes of Operating Conditions"; U.S. Appl. No. 13/020,740, filed Feb. 3, 2011.

*Primary Examiner* — Darren E Wolf
(74) *Attorney, Agent, or Firm* — Andrew D. Fortney; Central California IP Group, P.C.

(57) ABSTRACT

The disclosure relates to a tunable 50 GHz and 100 GHz channel spacing DWDM transceiver, and methods of making and using the same. The transceiver comprises an electro-absorption modulation laser (EML), a system board configured to compare a preset wavelength with an actual emission wavelength of the EML, a microcontroller and one or more associated registers configured to communicate with the system board, a temperature controlling circuit configured to stabilize the actual emission wavelength of the EML; and a wavelength meter connected to the output of the EML and having an output connected to the system board. The system board may be configured to provide a feedback loop from the EML to the microcontroller. The transceiver, suitable for 50 GHz channel spacing standards, can be made from existing standard transceivers and can switch between 50 GHz and 100 GHz channel spacing modes.

20 Claims, 4 Drawing Sheets

(56) References Cited

U.S. PATENT DOCUMENTS

2004/0161248 A1* 8/2004 Stewart et al. ............... 398/196
2005/0152701 A1* 7/2005 Liu et al. ...................... 398/135
2005/0271106 A1* 12/2005 Watanabe et al. ........ 372/46.013

* cited by examiner

FIG. 1

(Conventional Art)

TUNABLE DENSE WAVELENGTH DIVISION MULTIPLEXING TRANSCEIVER, CIRCUITS AND DEVICES THEREFOR, AND METHODS FOR MAKING AND USING SUCH TRANSCEIVERS, CIRCUITS AND DEVICES

CROSS REFERENCE TO RELATED APPLICATION

This application corresponds to Chinese Patent Application Nos. 201010124810.X and 201020131645.6, each of which was filed on Mar. 16, 2010, and each of which is hereby incorporated by reference as if fully set forth herein.

FIELD OF THE INVENTION

The present invention generally relates to the field of dense wavelength division multiplexing (DWDM) transceivers. More specifically, embodiments of the present invention pertain to methods of manufacturing a tunable channel spacing DWDM transceiver (e.g., that may be configured to operate at 50 GHz and/or 100 GHz channel spacing), and devices thereof.

DISCUSSION OF THE BACKGROUND

With increasing demands on communications in the world, and fast development of 3G and 4G networks now and in the future, the optical transceiver and fiber optics communication industries have started to focus on finding cost-effective solutions to improve the performance of communication systems and increase system bandwidths.

From the system application perspective, (i) full and effective use of fiber bandwidth and (ii) increases in the fiber data-carrying capacity are commercially feasible solutions. Wavelength division multiplexing (WDM) technology transports the carrier signals (e.g., carrying different information) having two or more different wavelengths together via a WDM multiplexer such as from a transmitter. Thus, over a single fiber, WDM technology ensures the transmission of a large capacity of information at the same time and provides high bandwidth for users through multiplexing different signals at different wavelengths, which carry different information. Optical carrier signals with different wavelengths can be separated by a WDM demultiplexer at the receiver for subsequent processing. An optical transmission network based on the WDM technology has the capacities of network reconfiguration and bandwidth expansion, and especially it has become a recent trend in high-speed video, voice and/or data transmission networks for the development and utilization of these capabilities.

Based on their different channel spacing, WDM can be classified into Coarse Wave Division Multiplexing (CWDM) and DWDM. Typically, CWDM has a channel spacing of 20 nm, whereas DWDM has a channel spacing of 0.2 nm to 1.2 nm. Since the channel spacing of CWDM is relatively wide in comparison to DWDM, light of 5 or 6 different wavelengths can be multiplexed on one fiber. In DWDM, approximately 80 wavelengths or data channels can be multiplexed into one optical data stream on one fiber. Therefore, the DWDM technology is widely applied in major networks of various service providers.

According to the International Telecommunication Union, Standardization Sector (ITU-T), standard wavelength spacing of the DWDM system must be a multiple of 0.4 nm (e.g., 50 GHz) or 0.8 nm (e.g., 100 GHz). For 100 GHz channel spacing, the transceiver requires a light source with stable operation wavelength and low chirp. As a result, a cooled Distributed Feedback (DFB) semiconductor laser or a Distributed Bragg Reflector (DBR) semiconductor laser, or a cooled DFB semiconductor laser monolithically integrated with an electro-absorption modulator (EM) can be utilized. These solutions provide desired wavelengths by adjusting the temperature of the laser to ensure an operation wavelength with no or minimal deviation, thereby avoiding optical crosstalk among the DWDM channels.

For 50 GHz channel spacing, maintaining the temperature of laser alone is not sufficient to avoid optical crosstalk because the wavelength coefficient versus the temperature of the semiconductor laser is 0.08-0.1 nm/° C. In addition, the performance characteristics of a thermistor, which is used as a standard temperature monitoring device for the feedback to temperature control loop, may gradually degrade with aging to cause changes in the temperature calibration value and then a change of the operation wavelength. Furthermore, a change in the temperature gradient inside the laser packaging can result in inaccurate output wavelengths because the required spacing among the 50 GHz channels may not be maintained. Typically, all of the above factors result in optical crosstalk among the DWDM channels.

In general, technology applied to DWDM semiconductor lasers for the 50 GHz channels must use a built-in wavelength locker. The wavelength locker is used as a data point for real-time calibration or locking to operation wavelengths. However, the wavelength locker increases both the size of the laser package and complexity of laser packaging, which then increases the cost of the DWDM laser. Therefore, a wavelength locker is generally not commercially feasible for a hot-pluggable transceiver.

DWDM transceivers, and more specifically, DWDM XFP transceivers using a cooled electro-absorption modulation laser (EML), achieve wavelength stability of approximately ±40 pm at the beginning of lifetime (BOL) and approximately ±100 pm at the end of lifetime (EOL). Typically, a 50 GHz channel spacing transceiver requires wavelength stability of approximately ±20 pm for compliance with BOL specification(s) and approximately ±50 pm for EOL specification(s). Currently, cooled EMLs can only be applied to DWDM XFP transceivers with 100 GHz wavelength channel spacing. State-of-the-art cooled EMLs generally cannot meet the requirements of 50 GHz channel spacing DWDM XFP transceivers.

Figure 1:
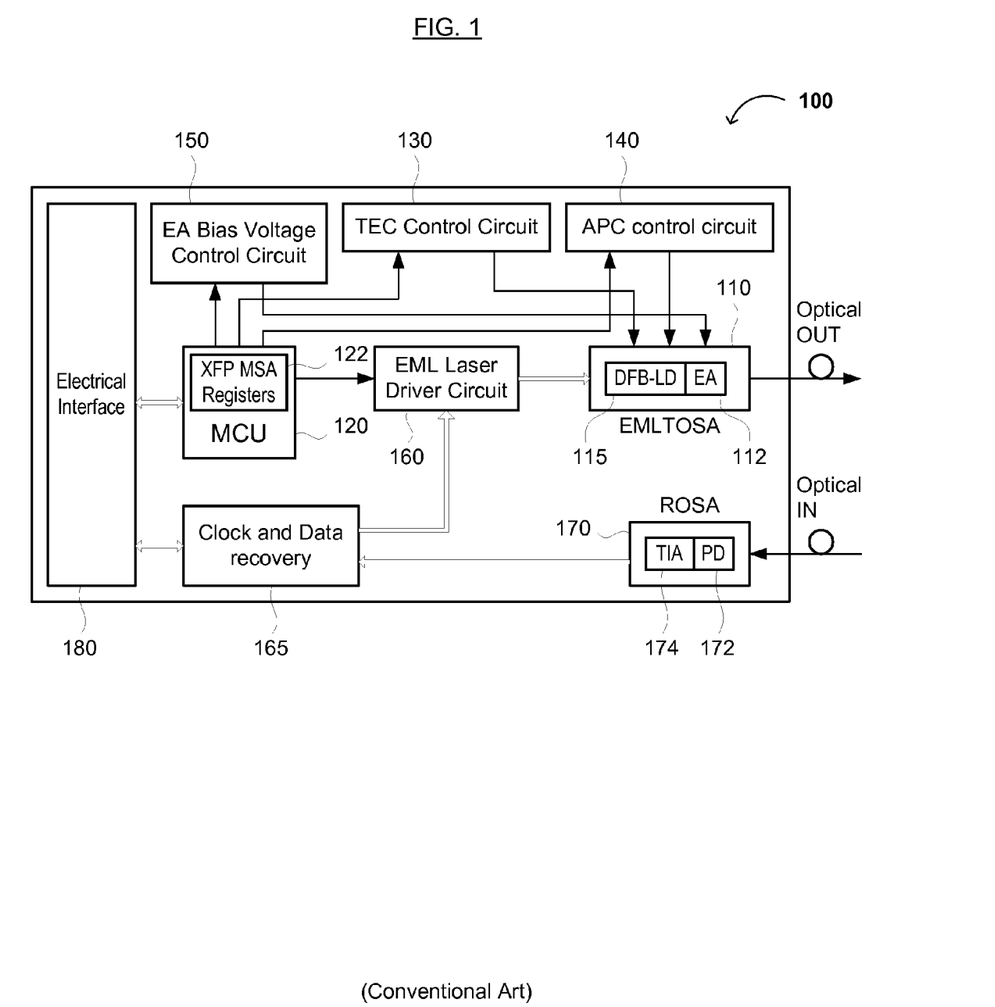
FIG. 1 is a diagram showing a conventional DWDM XFP transceiver.

FIG. 1 shows a block diagram of a DWDM XFP transceiver 100, in which a microprocessor (MCU) 120 comprising a processor core and a flash memory which stores XFP MSA registers 122, through a TEC control circuit 130, adjusts and controls a cooled DWDM EML transmitter optical sub assembly (TOSA) 110 that outputs optical data OUT according to one or more International Telecommunication Union (ITU) standards. However, conventional TEC control circuit 130 and APC control circuit 140 may cause the DWDM XFP transceiver 100 to fail to meet wavelength behavior requirements such as turn-on time in DWDM applications.

DWDM XFP transceiver 100 also includes an EML TOSA 110, which includes a distribution grating laser diode [DFB-LD] 115 and an electroabsorption [EA] modulator 112. The transmitter portion of transceiver 100 includes an EA modulation control block 150 that adjusts a bias voltage for the operating point of the EA 112, and an EML control circuit 160 that receives electrical data from the electrical interface 180 or a modified version thereof, through a Bias-tee circuit (not shown) and/or clock and data recovery circuit 165 to be applied to the EML TOSA 110. The receiver portion of transceiver 100 includes a receiver optical sub assembly (ROSA)

170 that includes a photodiode PD 172 and a transimpedance amplifier [TIA] 174, configured to receive optical data IN from the optical network and provide an electrical signal to the electrical interface 180 (which outputs electrical data EDOUT to an electrical device or network component).

SUMMARY OF THE INVENTION

Embodiments of the present invention relate to a tunable DWDM transceiver (e.g., capable of operating with 50 GHz and/or 100 GHz channel spacing within the same transceiver), circuits and devices for such a tunable DWDM transceiver, and methods of making and using the same. The circuits and device(s) are generally advantageous for tunable standard (e.g., 50 GHz and 100 GHz) channel spacing DWDM transceivers. The tunable DWDM transceiver generally comprises a system board configured to compare a preset wavelength (e.g., a pre-configured wavelength read from a register on the transceiver) with an actual wavelength of the transceiver (or the laser/transmitter component of the transceiver), a feedback loop configured to calibrate the laser and maintain a stability of the actual wavelength (e.g., by configuring a register such as an XFP MSA register in a microcontroller unit); a micro-controller configured to communicate with the system board and monitor the transceiver; a register (such as an XFP MSA register) configured to store feedback data corresponding to the comparison of the preset wavelength with the actual wavelength (e.g., of the transceiver or laser); a temperature controlling circuit configured to stabilize the actual wavelength (e.g., of the transceiver or laser); an EML receiving an output from the temperature controlling circuit; and a wavelength meter or other measuring device receiving an output from the EML. In one embodiment, the output of the wavelength measuring device is connected to the system board. In some embodiments of the present invention, the EML comprises a cooled EML and/or an EML that has been aged (e.g., processed through an aging treatment).

The method of use generally comprises comparing a pre-configured wavelength (e.g., read from a register on the transceiver) with an actual wavelength of the transceiver (or the laser or transmitter portion of the transceiver); calibrating and/or maintaining a stability of the actual wavelength by configuring a register (e.g., an XFP MSA register) in communication with a microcontroller; monitoring the transceiver (or the transmitter portion of the transceiver) using a microcontroller in communication with the register (e.g., the XFP MSA register); stabilizing the wavelength of the transceiver (or the transmitter portion of the transceiver) based on information from the microcontroller; and receiving an output from the EML laser in a wavelength meter. In one embodiment, the output of the transceiver (or the transmitter portion of the transceiver) communicates with a system board, and the output of the transceiver (or the transmitter portion of the transceiver) and the wavelength meter are connected to the system board. Alternatively, the method comprises measuring an actual emission wavelength of an electro-absorption modulation laser; comparing a pre-configured wavelength and the actual emission wavelength to determine a difference; communicating the difference via a feedback loop including a system board to a transceiver containing the electro-absorption modulation laser to calibrate the electro-absorption modulation laser and maintain a stability of the actual emission wavelength; communicating information (e.g., the pre-configured or pre-set transmission wavelengths, the actual emission wavelength, the age of the laser, etc.) between the system board and the transceiver to monitor the actual emission wavelength of the electro-absorption modulation laser, the transceiver having one or more registers associated with the micro-controller; and stabilizing the actual emission wavelength of the electro-absorption modulation laser (e.g., by adjusting the actual emission wavelength to more closely match the pre-configured or pre-set transmission wavelength).

The method of making a transceiver generally comprises connecting a micro-controller configured to monitor the transceiver with a system board; storing preset wavelength information in a register (such as an XFP MSA register) associated with the micro-controller; configuring a wavelength meter or other measuring device to (i) receive an output from an EML and (ii) output a measured wavelength to the system board; electrically connecting a temperature controlling circuit configured to stabilize the actual wavelength (e.g., of the transceiver or laser) between the micro-controller and the EML; constructing a feedback loop from the wavelength measuring device and the system board; and configuring the system board to compare a preset wavelength with an actual wavelength of the transceiver (or the laser/transmitter component of the transceiver). In one embodiment, the feedback loop enables calibration of the laser and maintenance of the actual wavelength (e.g., by configuring and/or updating the register, such as an XFP MSA register in a microcontroller unit). In other embodiments, the register is configured to store feedback data corresponding to the comparison of the preset wavelength with the actual wavelength (e.g., of the transceiver or laser). In further embodiments, the method further comprises coupling a cooling mechanism or device to the EML and/or aging (e.g., applying an aging treatment) to the EML.

The present invention advantageously provides a tunable 50 GHz and 100 GHz channel spacing DWDM transceiver that overcomes the shortcomings of existing technology, and enables making a standard transceiver suitable for 50 GHz channel spacing from existing standard transceivers and available low-cost standard optics. In addition, the present invention advantageously allows transmissions from a DWDM transceiver at both 50 GHz and 100 GHz channel spacings (transferring between a 50 GHz mode and a 100 GHz mode).

These and other advantages of the present invention will become readily apparent from the detailed description of preferred embodiments below.

DETAILED DESCRIPTION

Reference will now be made in detail to various embodiments of the invention, examples of which are illustrated in the accompanying drawings. In order to achieve the objectives, technical solutions and advantages of the present invention more clearly, further details of the invention are described below with regard to the Figures. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention. The embodiments described here are only used to explain, rather than limit, the invention.

For the sake of convenience and simplicity, the terms "device," "transmitter" and "transceiver" are generally used interchangeably herein, but are generally given their art-recognized meanings. Also, for convenience and simplicity, the terms "cooled" and "refrigerated" (and grammatical variants thereof) may be used interchangeably, as may the terms "connected to," "coupled with," "coupled to," and "in communication with" (which terms also refer to direct and/or indirect relationships between the connected, coupled and/or communicating elements unless the context of the term's use unambiguously indicates otherwise), but these terms are also generally given their art-recognized meanings.

FIG. 1 illustrates a standard cooled DWDM XFP transceiver. The standard cooled DWDM XFP transceiver has a cooled EML laser 110, a temperature control circuit 130 that stabilizes the working wavelength of the EML laser 110, and other drive circuits. The transceiver of FIG. 1 also includes a micro-controller 120 that communicates with a system board (not shown) and monitors the work of the transceiver, such as bias (e.g., bias current and/or bias voltage) and control wavelength of the laser 110. In this operation mode, by monitoring the thermistor resistance inside the laser 110, the temperature control circuit 130 forms a negative feedback loop to adjust and maintain the wavelength of transmissions from the laser 110 within a preset range.

Figure 2:
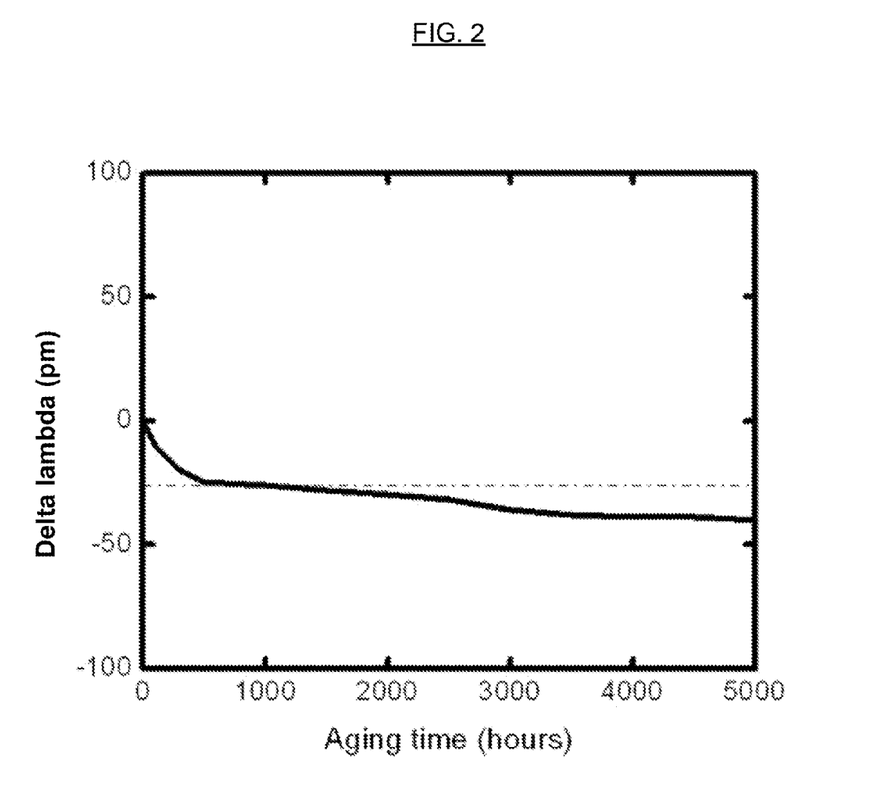
FIG. 2 is a graph illustrating a curve of the operation wavelength of an EML laser as a function of aging (e.g., accelerated burn-in) time.

In the present invention, the EML laser is preferably an accelerated burn-in EML laser (i.e., one that has been subjected to a fast aging treatment). FIG. 2 is a graph showing the difference in emission wavelength (delta lambda, or $\Delta\lambda$) of an EML laser relative to the original emission wavelength (set at 0 pm) as a function of time (measured in hours of use). As shown in FIG. 2, after an accelerated burn-in treatment (e.g., about 400 to 500 hours), the wavelength of the EML laser provides relatively excellent wavelength stability. Typically, the wavelength deviates mainly due to aging of the thermistor and/or internal stress and temperature gradient changes of the components. Therefore, the EML laser of the present invention may be exposed to an accelerated aging treatment and/or process at, in or during the beginning of its lifetime to minimize deviations in its emission wavelength and/or the impact of effects of an aging thermistor and internal stresses on the emission wavelength, thereby stabilizing the wavelength within a range suitable for 50 GHz channel spacing in subsequent operations.

Figure 3:
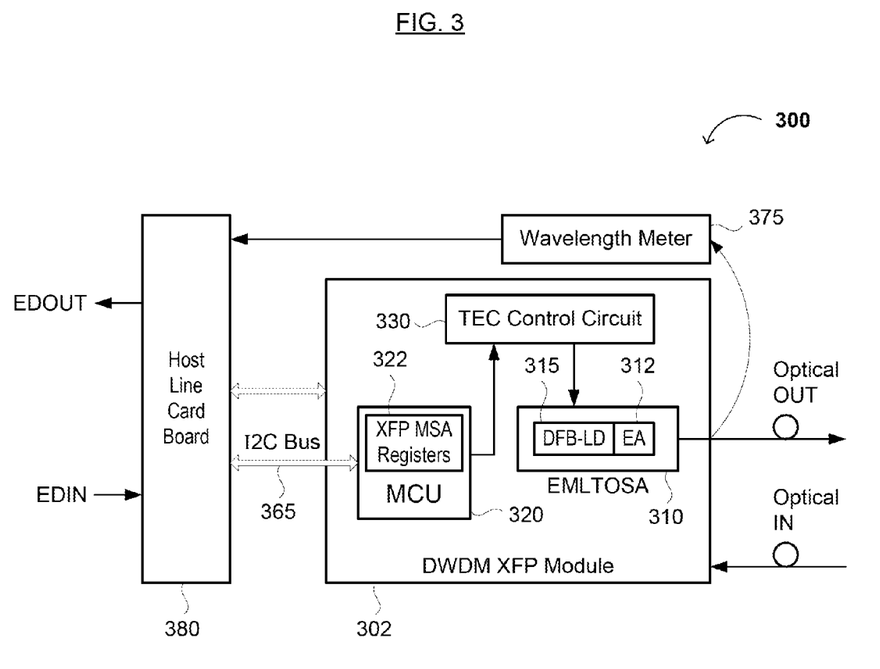
FIG. 3 is an exemplary embodiment of an optical transmitter or transceiver according to the present invention.

FIG. 3 shows an embodiment of a tunable 50 GHz and 100 GHz channel spacing DWDM XFP transceiver 300, including a wavelength meter 375. The wavelength meter 375 is used to monitor and calculate the difference between a preset or predetermined laser emission wavelength and the actual working wavelength. Subsequently, the wavelength meter feeds information back to the system (e.g., host line card) board 380 to correct any wavelength variation of the transceiver 300 via software (e.g., in the XFP MSA registers 322).

In addition, the DWDM XFP transceiver 300 includes a DWDM XFP module 302, which includes a microprocessor (MCU) 320 comprising a processing unit and XFP MSA registers 322, a TEC control circuit 330 configured to receive an output of the MCU 320 and that adjusts and/or controls the cooled DWDM EML transmitter optical sub assembly (TOSA) (e.g., EML laser) 310 that outputs optical data OUT according to one or more International Telecommunication Union (ITU) standards. The MCU 320 is configured to communicate with the system board 380 over I2C bus 365 and monitor the work of the transceiver 300. In alternative embodiments, the I2C bus can be replaced by any suitable serial or parallel bus capable of transferring information between the system board 380 and the MCU 320. The temperature control circuit 330 is configured to control the temperature of the EML TOSA 310 (e.g., by controlling the duty cycles, frequency, and/or signal power of the EML) and thereby stabilize the emission wavelength of the transceiver 300.

EML TOSA 310 includes a distribution grating laser diode [DFB-LD] 315 and an electroabsorption modulator [EA] 312. The transceiver 300 includes an electrical interface 380 (e.g., receiving electrical input data [EDIN, not shown] or a modified version thereof), which provides data through the I2C bus 365 to be applied to the EML TOSA 310. The wavelength meter 375 is configured to receive optical data ODIN from the optical network and provide an electrical signal to the electrical interface and/or system board 380 (which outputs electrical output data [EDOUT, not shown] to an electrical device or network component). In various embodiments of the present invention, the wavelength measuring device (e.g., wavelength meter 375) provides one or more wavelength data points. The system board 380 is configured to compare the read configured (e.g., predetermined) emission wavelength(s) with the actual working emission wavelength(s) of the transceiver, and form a negative feedback loop to calibrate and maintain the stability of the emission wavelength(s) by configuring the XFP MSA registers 322 (or a specified register or registers therein). The wavelength meter 375 receives the output of the EML laser 310, and provides information about the output of the EML laser 310 to the system board 380.

Thus, the tunable 50 GHz and 100 GHz channel spacing DWDM transceiver comprises (1) a system board, to compare the read configured (e.g., predetermined) emission wavelength with the actual emission wavelength of the transceiver 300 and form a negative feedback loop with the system board 380, MCU 320 and TEC control circuit 330 to calibrate and maintain the stability of the emission wavelength by configuring the XFP MSA register(s) 322 specified in the MCU 320; (2) a micro-controller 320 with XFP MSA registers 322, configured to communicate with the system board 380 and monitor the work of the transceiver 300 (or the transmitter portion thereof, including EML 310); a temperature control circuit 330 configured to stabilize the emission wavelength of the transceiver 300 (or of EML 310); a EML 310; and a wavelength meter 375 receiving the output of the EML 310 and connected to the system board 380. In various embodiments of the present invention, the transceiver can be configured for one or both of 50 GHz and 100 GHz channel spacings, and in one embodiment, allows switching between 50 GHz and 100 GHz channel spacing configurations.

Figure 4:
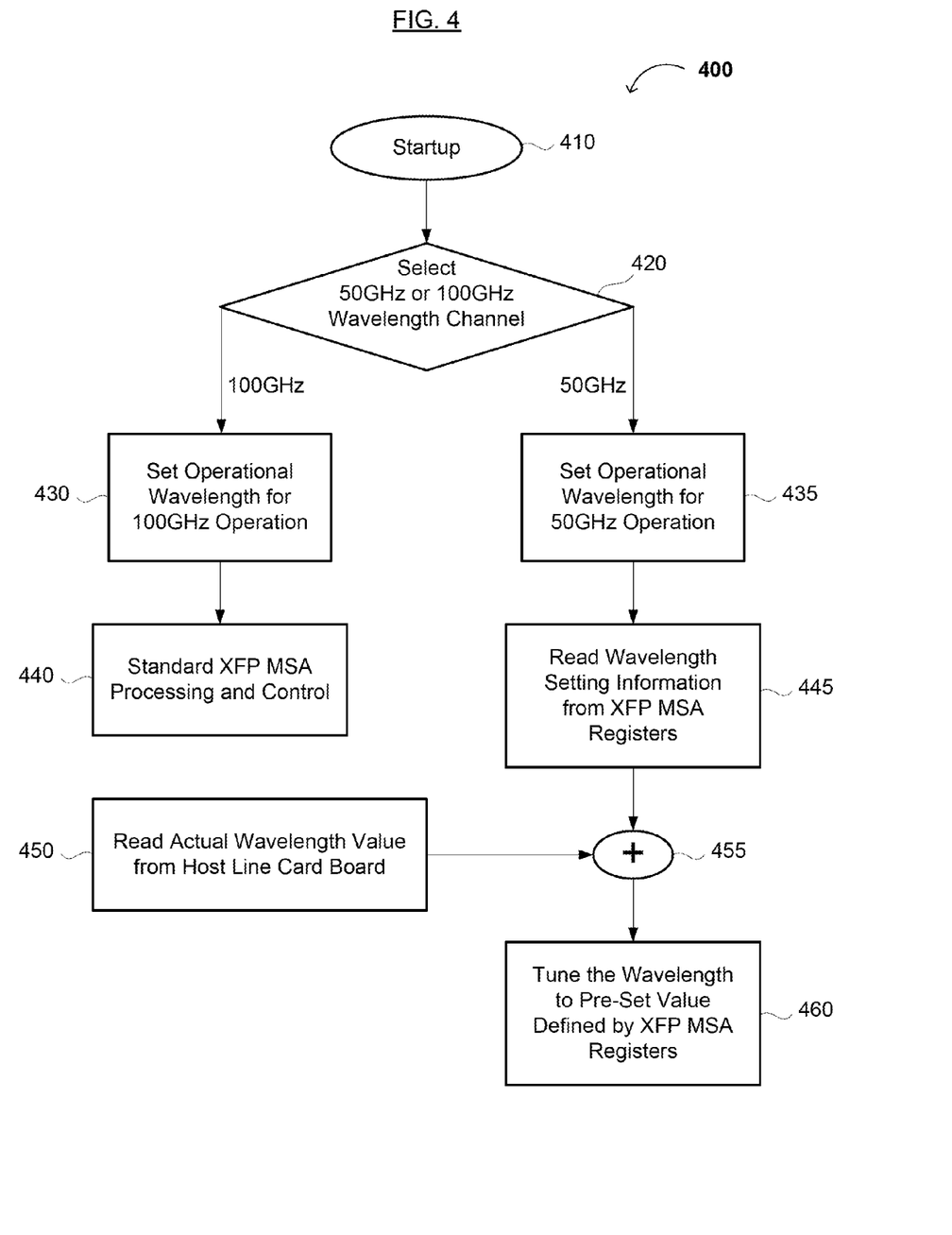
FIG. 4 is a flow chart of an exemplary method or process according to the present invention.

FIG. 4 is a flow chart 400 of an exemplary method of tuning a transceiver capable of both 50 GHz and 100 GHz channel spacing. First, power is applied to the DWDM device (or a power-up or startup mode is entered) at 410. Second, 50 GHz or 100 GHz channel spacing is selected (e.g., by a system user or host line card) through setting the XFP MSA registers inside the transceiver's MCU (or, alternatively, a 50 GHz or 100 GHz mode of operation is entered) at 420.

To select the 100 GHz channel spacing, the operational wavelength spacing is set at 0.8 nm (or greater, but generally, at a multiple of 0.8 nm, such as 1.6 nm, 2.4 nm, etc.) by an XFP MSA register at 430. Next, the transceiver's MCU controls setting the wavelength to a 100 GHz channel. For example, the MCU reads standard XFP MSA registers to determine the parameters for the laser settings, including a temperature lookup table, etc., to pre-compensate for any expected change in wavelength as a function of operational time. In general, the present method does not need wavelength feedback information from the host line card; empirically-determined pre-compensation for long-term wavelength stability is generally sufficient for processing and control of the transceiver's 100 GHz channel spacing operation wavelengths through use of the XFP MSA registers at 440.

On the other hand, if 50 GHz channel spacing is selected at 420, then the working or operational wavelength spacing is set at 0.4 nm (or greater, but generally, at a multiple of 0.4 nm) by the XFP MSA register at 435, and the wavelength setting information is read from the XFP MSA registers at 445. Subsequently, the actual emission wavelength of the laser is read from the system board (e.g., host line card board 380 in FIG. 3) at 450, and the laser is calibrated according to the difference between the pre-set wavelength and the actual emission wavelength at 450. The difference is calculated by comparing the actual emission wavelength from the wavelength meter with the setting read out from the XFP MSA register at 455. The XFP tunes the wavelength of the laser to the pre-set value in the XFP MSA registers (e.g., by adjusting the emission wavelength of the laser towards the setting in the register) at 460.

The process can be repeated periodically and/or as needed during the lifetime of the transceiver. Alternatively, the procedure outlined for measuring the difference between the pre-set wavelength and the actual emission wavelength, and tuning the wavelength of the laser can be performed for the 100 GHz mode settings instead of or in addition to the 50 GHz settings.

CONCLUSION/SUMMARY

Thus, the present invention provides a tunable 50 GHz and 100 GHz channel spacing DWDM transceiver and method of using the same. The method generally comprises comparing a read configured wavelength (e.g., from a register in the transceiver) with the actual emission wavelength of the transceiver (e.g., via a system board), calibrating and maintaining the stability of the laser emission wavelength via a negative feedback loop (e.g., by configuring the XFP MSA register in the transceiver microcontroller); communicating with the system board and monitoring the work of the transceiver via a microcontroller with one or more XFP MSA registers, and stabilizing the emission wavelength of the transceiver (e.g., using the result of the comparison to update the register[s]). In one embodiment, the invention relates to a wavelength meter connected to (i) an output end of an EML laser in the transceiver and (ii) the system board.

The device generally relates to a tunable 50 GHz and 100 GHz channel spacing DWDM transceiver. The tunable DWDM transceiver generally comprises a system board configured to compare a preset emission wavelength (e.g., the configured wavelength read from a register in the transceiver) with the actual emission wavelength of the transceiver; a negative feedback loop that configures a register (e.g., an XFP MSA register) in the transceiver, to thereby calibrate and maintain the stability of the actual emission wavelength; a micro-controller having one or more associated registers (e.g., an XFP MSA register), configured to communicate with system board and monitor the emission wavelength(s) of the transceiver; a temperature controlling circuit configured to stabilize the emission wavelength of the transceiver; an EML laser; and a wavelength meter receiving an output of the EML laser and having an output connected to the system board.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A transceiver feedback loop, comprising:
a system board configured to compare, during data communication, a preset wavelength with an actual emission wavelength of an electro-absorption modulation laser, configured to provide feedback data to calibrate and maintain stability of the actual emission wavelength and correct any wavelength variation between the preset wavelength and the actual emission wavelength;
a transceiver module, including:
a micro-controller and one or more associated registers, configured to communicate with the system board and monitor at least part of the transceiver, wherein the one or more associated registers store information for the preset wavelength;
a temperature controlling circuit, configured to control the temperature of the electro-absorption modulation laser and stabilize the actual emission wavelength of the electro-absorption modulation laser responsive to said actual emission wavelength; and
the electro-absorption modulation laser, wherein the electro-absorption modulation laser is an aged electro-absorption modulation laser; and
an external wavelength measuring device receiving an optical output of the electro-absorption modulation laser, monitoring the actual emission wavelength, and having an output connected to the system board,
wherein said output is indicative of said actual emission wavelength of said electro-absorption modulation laser, and wherein said output is used to correct any wavelength variation between the preset wavelength and the actual emission wavelength.

2. The transceiver feedback loop of claim 1, further comprising a cooling and/or refrigerating mechanism configured to cool the electro-absorption modulation laser.

3. The transceiver feedback loop of claim 1, wherein the wavelength measuring device comprises a wavelength meter.

4. The transceiver feedback loop of claim 1, wherein the microcontroller comprises a processing unit.

5. The transceiver feedback loop of claim 1, wherein the electro-absorption modulation laser comprises a distribution grating laser diode and an electroabsorption modulator.

6. The transceiver feedback loop of claim 1, further comprising a serial bus configured to carry communications between the system board and the microcontroller.

7. A tunable channel spacing DWDM transceiver, comprising the transceiver feedback loop of claim 1.

8. The DWDM transceiver of claim 7, wherein the register(s) comprise an XFP MSA register configured to store values for the preset wavelength(s).

9. The DWDM transceiver of claim 8, wherein the electro-absorption modulation laser emits light at a plurality of preset wavelengths, and the preset wavelengths have a spacing of at least 0.4 nm.

10. The DWDM transceiver of claim 8, wherein the electro-absorption modulation laser emits light at a plurality of preset wavelengths, and the preset wavelengths have a spacing of at least 0.8 nm.

11. A method of tuning a dense wavelength division multiplexing (DWDM) device, comprising:
measuring, during data communication, an actual emission wavelength of an aged electro-absorption modulation laser using a wavelength measuring device external to a transceiver module that includes the aged electro-absorption modulation laser, and feeding back one or more data points about the actual emission wavelength back to a system board;
comparing a pre-configured wavelength and the actual emission wavelength to determine a difference;
communicating the difference via a feedback loop including the system board to the transceiver module containing the aged electro-absorption modulation laser to calibrate the aged electro-absorption modulation laser and maintain a stability of the actual emission wavelength;
communicating information between the system board and the transceiver module to monitor the actual emission wavelength of the electro-absorption modulation laser, the transceiver module having a micro-controller and one or more registers associated with the micro-controller that store information for the preset wavelength; and
stabilizing the actual emission wavelength of the electro-absorption modulation laser by correcting any wavelength variation between the pre-configured wavelength and the actual emission wavelength via said feedback loop, wherein an input to said feedback loop is said one or more data points about the actual emission wavelength.

12. The method of claim 11, wherein the transceiver module comprises a tunable channel spacing DWDM transceiver.

13. The method of claim 12, wherein the tunable channel spacing DWDM device is configured to operate in both 50 GHz and 100 GHz transmission modes.

14. The method of claim 11, wherein the one or more registers comprise an XFP MSA register associated with the micro-controller.

15. The method of claim 11, further comprising cooling the electro-absorption modulation laser.

16. The method of claim 11, wherein the electro-absorption modulation laser emits light at a plurality of preset wavelengths, and the preset wavelengths have a spacing of at least 0.4 nm.

17. The method of claim 11, wherein the electro-absorption modulation laser emits light at a plurality of preset wavelengths, and the preset wavelengths have a spacing of at least 0.8 nm.

18. The transceiver feedback loop of claim 3, wherein the system board calculates a difference between the preset wavelength and the actual emission wavelength by comparing the actual emission wavelength from the wavelength meter with a setting read from one of the one or more associated registers.

19. The DWDM transceiver of claim 8, wherein the system board calculates a difference between the preset wavelength and the actual emission wavelength by comparing the actual emission wavelength from the wavelength measuring device with a setting read from the XFP MSA register.

20. The method of claim 11, further comprising burning-in an electro-absorption modulation laser for at least about 400 hours to provide the aged electro-absorption modulation laser.

* * * * *